US009454328B2

(12) United States Patent
Lim et al.

(10) Patent No.: US 9,454,328 B2
(45) Date of Patent: Sep. 27, 2016

(54) CONTROLLING HIERARCHICAL STORAGE

(71) Applicant: KT CORPORATION, Gyeonggi-do (KR)

(72) Inventors: Hyong-Muk Lim, Daejeon (KR); Bom-Soo Kim, Daejeon (KR); Choon-Gul Park, Daejeon (KR); Ki-Tae Jeong, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 91 days.

(21) Appl. No.: 14/582,804

(22) Filed: Dec. 24, 2014

(65) Prior Publication Data

US 2015/0178016 A1 Jun. 25, 2015

(30) Foreign Application Priority Data

Dec. 24, 2013 (KR) ........................ 10-2013-0162693

(51) Int. Cl.
*G06F 12/02* (2006.01)
*G06F 3/06* (2006.01)

(52) U.S. Cl.
CPC ........... *G06F 3/0656* (2013.01); *G06F 3/0608* (2013.01); *G06F 3/0611* (2013.01); *G06F 3/0649* (2013.01); *G06F 3/0685* (2013.01)

(58) Field of Classification Search
CPC .. G06F 3/0656; G06F 3/0608; G06F 3/0685; G06F 3/0611; G06F 3/0649
USPC ......................................... 711/102, 117, 165
See application file for complete search history.

(56) References Cited

U.S. PATENT DOCUMENTS

| 2006/0064441 | A1 | 3/2006 | Yamamoto | |
|---|---|---|---|---|
| 2006/0136661 | A1 | 6/2006 | Toshine | |
| 2006/0149901 | A1 | 7/2006 | Sasage et al. | |
| 2008/0155613 | A1* | 6/2008 | Benya | H04N 7/17318 725/89 |
| 2010/0115222 | A1* | 5/2010 | Usami | G06F 3/061 711/170 |
| 2010/0241616 | A1* | 9/2010 | Murphy | G06F 11/004 707/661 |
| 2011/0271071 | A1 | 11/2011 | Nakatogawa | |
| 2013/0054528 | A1* | 2/2013 | Saika | G06F 3/0608 707/638 |
| 2013/0283295 | A1* | 10/2013 | Glover | G06F 11/3034 719/318 |
| 2014/0258672 | A1* | 9/2014 | Herron | G06F 12/0223 711/171 |

(Continued)

FOREIGN PATENT DOCUMENTS

| JP | 2006-092124 A | 4/2006 |
|---|---|---|
| JP | 2011-233009 A | 11/2011 |

(Continued)

*Primary Examiner* — Hiep Nguyen
(74) *Attorney, Agent, or Firm* — IP Legal Services, LLC

(57) ABSTRACT

Provided is a method of distributedly storing an individual content in a hierarchical storage system including a solid state storage having a plurality of solid state disks, a hard disk storage having a plurality of hard disks, and a tape storage. The method may include determining a target content to store and an inquiry frequency and a required minimum transmission rate of the target content upon receipt of a request message from a client device, classifying the target content as at least one of a low demanded content, a normal demanded content, a high demanded content, a low transmission rate content, a normal transmission rate content, and a high transmission rate content based on the inquiry frequency and the required minimum transmission rate of the target content, and distributedly storing the target content through at least one of the solid state storage, the hard disk storage, and the tape storage based on the classification result and a distribution and buffering policy.

20 Claims, 5 Drawing Sheets

(56) References Cited

U.S. PATENT DOCUMENTS

2014/0297909 A1* 10/2014 Aiura ............... G06F 3/0608 710/74
2014/0325151 A1* 10/2014 Kim ............... G06F 17/30221 711/117
2015/0160858 A1* 6/2015 Okada ............... G06F 3/061 711/114

FOREIGN PATENT DOCUMENTS

| KR | 10-2006-0070394 A | 6/2006 |
| KR | 10-2006-0080522 A | 7/2006 |
| KR | 10-1023585 B1 | 3/2011 |

* cited by examiner

CONTROLLING HIERARCHICAL STORAGE

CROSS REFERENCE TO PRIOR APPLICATIONS

The present application claims priority under 35 U.S.C. §119 to Korean Patent Application No. 10-2013-0162693 (filed on Dec. 24, 2013).

BACKGROUND

The present disclosure is related to controlling a hierarchical storage including a solid-state disk storage, a hard disk storage, and a tape storage.

Typically, hard disk storage has been considered as a major storage device to store and manage massive contents regardless of an inquiry frequency and a required minimum transmission rate of each content. However, a hard disk has latency not fast enough to satisfy consumers of multimedia contents (e.g., multimedia streaming service). A solid state disk has been used to reduce such latency to access a target content and to quickly provide the target content to a consumer. However, there is a limitation to use a solid state disk to store massive amount of contents due to high cost.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect, a hierarchical storage system may include a tape storage, a hard disk, and a solid state disk.

In accordance with another aspect, contents having a comparatively low inquiry frequency may be stored in a tape storage and transferred to a hard disk and a solid state disk according to the increment of inquiry frequency.

In accordance with at least one embodiment, a method may be provided for distributedly storing an individual content in a hierarchical storage system including a solid state storage having a plurality of solid state disks, a hard disk storage having a plurality of hard disks, and a tape storage. The method may include determining a target content to store and an inquiry frequency and a required minimum transmission rate of the target content upon receipt of a request message from a client device, classifying the target content as at least one of a low demanded content, a normal demanded content, a high demanded content, a low transmission rate content, a normal transmission rate content, and a high transmission rate content based on the inquiry frequency and the required minimum transmission rate of the target content, and distributedly storing the target content through at least one of the solid state storage, the hard disk storage, and the tape storage based on the classification result and a distribution and buffering policy.

In accordance with another embodiment, a method may be provided for retrieving an individual content distributedly stored in a hierarchical storage system including a solid state storage having a plurality of solid state disks, a hard disk storage having a plurality of hard disks, and a tape storage. The method may include determining a target content to retrieve and an inquiry frequency and a required minimum transmission rate of the target content upon receipt of a request message from a client device, classifying the target content as at least one of a low demanded content, a normal demanded content, a high demanded content, a low transmission rate content, a normal transmission rate content, and a high transmission rate content based on the inquiry frequency and the required minimum transmission rate of the target content, and retrieving the target content from at least one of the solid state storage, the hard disk storage, and the tape storage based on the classification result and a distribution and buffering policy.

In accordance with still another embodiment, a method may be provided removing an individual content distributedly stored in a hierarchical storage system including a solid state storage having a plurality of solid state disks, a hard disk storage having a plurality of hard disks, and a tape storage. The method may include determining a target content to remove and an inquiry frequency and a required minimum transmission rate of the target content upon receipt of a request message from a client device, classifying the target content as at least one of a low demanded content, a normal demanded content, a high demanded content, a low transmission rate content, a normal transmission rate content, and a high transmission rate content based on the inquiry frequency and the required minimum transmission rate of the target content, and removing a duplication of the target content from at least one of the solid state storage, the hard disk storage, and the tape storage based on the classification result and a distribution and buffering policy.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
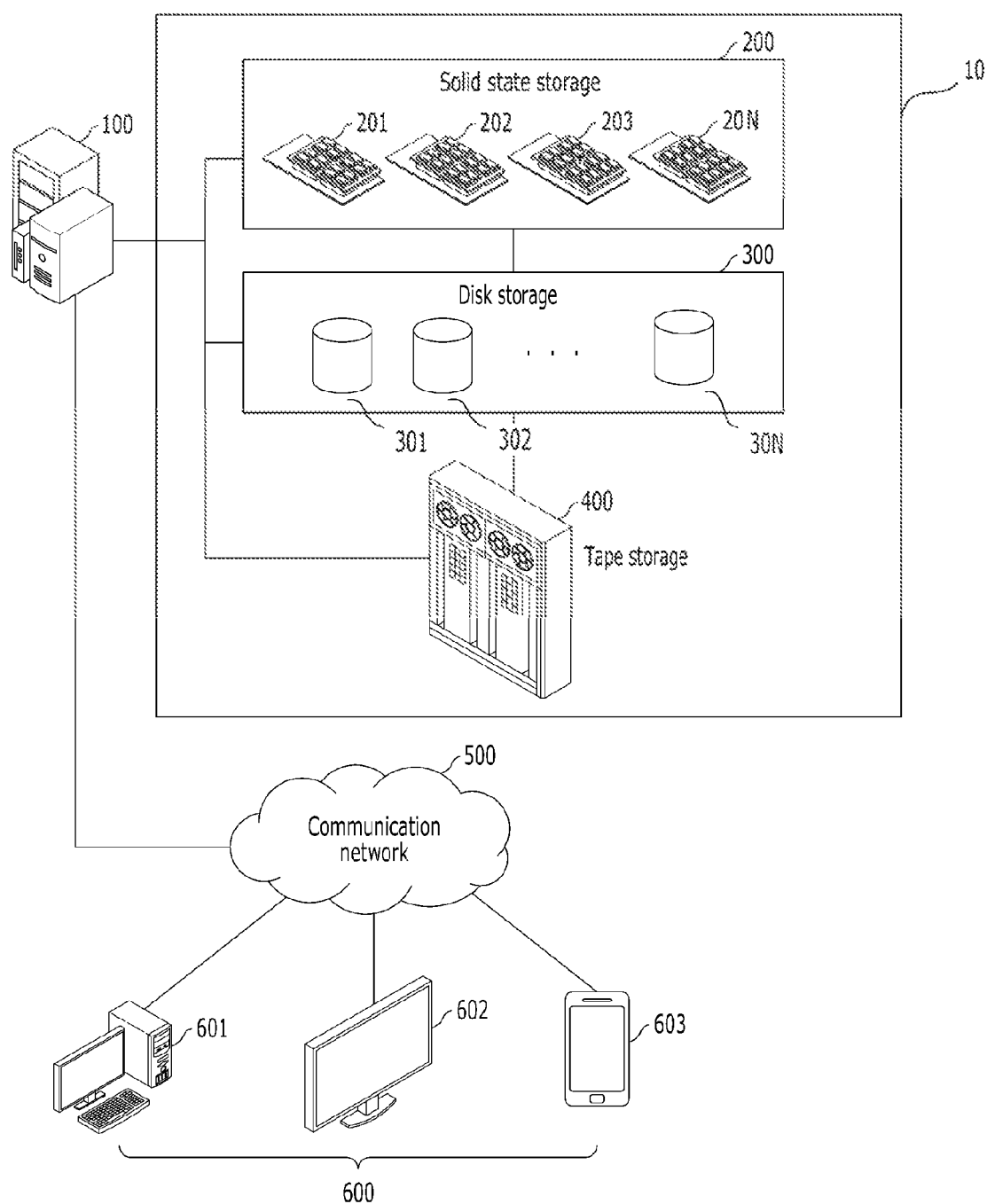
FIG. 1 illustrates a hierarchical storage system in accordance with at least one embodiment.

Reference will now be made in detail to embodiments of the present disclosure, examples of which are illustrated in the accompanying drawings, wherein like reference numerals refer to like elements throughout. The embodiments are described below, in order to explain the present invention by referring to the figures.

In accordance with at least one embodiment, each one of massive contents may be stored, retrieved, and removed based on at least one of an inquiry frequency and a required minimum transmission rate thereof in a hierarchical storage having a solid state disk storage, a hard disk storage, and a tape storage. In particular, an individual content may be distributedly stored through at least one of a solid-state disk storage, a hard disk storage, and a tape storage and at least one duplication of the individual content may be buffered through at least one of a solid-state disk storage, a hard disk storage, and a tape storage based on a distribution and buffering policy. Hereinafter, such a hierarchical storage system will be described with reference to FIG. 1.

FIG. 1 illustrates a control server coupled to a hierarchical storage system in accordance with at least one embodiment.

Referring to FIG. 1, control server 100 may be coupled to hierarchical storage system 10 having solid state disk storage 200, hard disk storage 300, and tape storage 400. Control server 100 may be coupled to client device 600 through communication network 500. Client device 600 may include personal computer 601, television set 602, and smart phone 603, but the present invention is not limited thereto.

Hierarchical storage system 10 may be a set of storage devices for storing and managing massive amount of contents. For example, hierarchical storage system 10 may be a group of different types of storage devices installed at one data center (e.g., a building of a service provider) or scattered through remote places and coupled through a communication network (e.g., cloud storage system). Hierarchical storage system 10 may store and manage a massive amount of contents in response to control of control server 100 in accordance with at least one embodiment. For example, hierarchical storage system 10 may be a storage system storing various types of multimedia contents (e.g., movie, music, and image) for a service provider of on-demand internet streaming media.

In accordance with at least one embodiment, hierarchical storage system 100 may include solid state disk storage 200, hard disk storage 300, and tape storage 400. Solid state disk storage 200 may be referred to a first hierarchical storage and include a plurality of solid state disks 201 to 20N coupled to each other. Solid state disks 201 to 20N may have the fastest access time and be used to store high demanded contents having a high inquiry frequency and high transmission rate contents requiring a high transmission rate. Hard disk storage 300 may have an access time slower than solid state disks 201 to 20N but faster than tape storage 400. Hard disk storage 300 may be referred to a second hierarchical storage and include a plurality of hard disks 301 to 30N. Hard disk storage 300 may be used to store normal demanded contents having a normal inquiry frequency and normal transmission rate contents requiring a normal transmission rate. Tape storage 400 may have the slowest access time and be referred to a third hierarchical storage and include a plurality of tape drives and tape cartridges. The tape cartridges are mounted on or un-mounted from tape drivers. In response to a retrieval request message, a target content to retrieve may be read from a tape cartridge. In response to a store request message, a target content may be stored in a predetermined tape cartridge. Tape storage 400 may be used to store low demanded contents having a low inquiry frequency and low transmission rate contents requiring a low transmission rate.

Control server 100 may be a computing device for managing and controlling hierarchic storage system 10 having solid state disk storage 200, hard disk storage 300, and tape storage 400 according to a distribution and buffering policy in accordance with at least one embodiment. In particular, control server 100 may receive a request (e.g., store, retrieve, or remove) from client device 600 and control hierarchical storage system 10 to store, retrieve, or remove a target content. In order to provide a target content at high speed and maintain the system cost effectively, control server 100 may adapt a distribution and buffering policy to control and manage hierarchical storage system 10 in accordance with at least one embodiment.

Such a distribution and buffering policy may be set based on various factors by at least one of a system designer, an operator, a service provider, and a user. The distribution and buffering policy may be set to effectively and economically store contents in at least one of three hierarchical storages and manage the stored contents. For example, the distribution and buffering policy may be set to store i) contents having a low inquiry frequency or a low required minimum transmission rate in tape storage 400, ii) contents having a normal inquiry frequency or a normal required minimum transmission rate in hard disk storage 300, and iii) contents having a high inquiry frequency or a high required minimum transmission rate in solid state disk storage 200. In addition, the distribution and buffering policy may be set to distributedly store an individual content through at least one of solid state disk storage 200, hard disk storage 300, and tape storage 400 and to differently divide the individual content according to an inquiry frequency and a required minimum transmission rate thereof.

In particular, the distribution and buffering policy may be set as follows. First, an individual content may be divided into at least one of an initial beginning part, a second beginning part, and a reaming part and distributedly stored through at least one of solid state disk storage 200, hard disk storage 300, and tape storage 400 based on an inquiry frequency and a minimum transmission rate.

Second, data amounts of the initial beginning part, the second beginning part, and the remaining part of an individual content may be determined a) a maximum latency time to access the remaining part stored in tape storage 400, b) a user waiting time of receiving at least one of the initial beginning part, the second beginning part, and the remaining part, and c) the maximum number of sessions allowed to access a corresponding content.

Third, the data amounts of the initial beginning part and the second beginning part distributedly stored in state solid disk storage 200 and hard disk storage 300 may be dynamically controlled as follows: a) a multistage buffering method is decided according to increment in inquiry frequency; b) a content is duplicated from tape storage 400 to hard disk storage 300 at an initial content inquiry; c) a content is duplicated from a hard disk to the other hard disk when content inquiry session of a hard disk reaches a maximum session number of a hard disk; d) a content is duplicated from hard disk storage 300 to solid state disk storage 200 when content inquiry sessions of hard disk storage 300 reaches a maximum session number of hard disk storage 300; and e) a content is copied from one solid state disk to the other solid state disk when content inquiry session reaches a maximum session number of a solid state disk.

Fourth, the number of duplications may be controlled according to decrement in content inquiry sessions as follows: a) a duplication copied in solid state disk storage 200 is deleted upon decrement of content inquiry session of the duplication stored in a solid state disk; b) a duplication copied in hard disk storage 300 is deleted upon decrement of content inquiry session of the duplication stored in a hard disk; c) a corresponding content stored in tape storage 400 is only maintained when overall content inquiry session decreases under a predetermined threshold.

As described, the distribution and buffering policy may be set differently according to an inquiry frequency and a transmission rate of a content serviced to a user. That is, a content may be classified into a low demanded content, a normal demanded content, and a high demanded content, or a low transmission rate content, a normal transmission rate content, and a high transmission rate content. For example, in case of a low demanded content or low transmission rate content, the distribution and buffering policy may be defined to store such a low demanded content distributedly through hard disk storage 300 and tape storage 400. For example, an initial beginning part of a low demanded content may be stored in hard disk storage 300 and the remaining part of the low demanded content may be stored in tape storage 400. Such a size of a predetermined part stored in hard disk storage 300 may be determined based on a maximum access latency time to access the remaining part stored in tape storage 400. Such a maximum access latency time may differ according to a storage location of the remaining part in tape storage 400. The size of the remaining part stored in tape storage 400 may be determined by subtracting the predetermined part stored in hard disk storage 300 for the total size of the content.

Furthermore, a buffering method of the distribution and buffering policy for the low demanded content may be defined in an order of tape storage 400 and first hard disk 301 to $N^{th}$ hard disk 30N according to increment in a session number of each hard disk. The number of maximum sessions acceptable at each hard disk may be determined as a result of dividing a hard disk processing capability by a required transmit rate. The number of buffering hard disks may be determined by a result of dividing the maximum access session number by the number of maximum sessions acceptable at each hard disk.

In case of a normal demanded content (e.g., normal transmission rate content), the distribution and buffering policy may be defined to store such a normal demanded content distributedly through three storages: solid state disk storage 200, hard disk storage 300, and tape storage 400. For example, an initial beginning part of a normal demanded content may be stored in solid state disk storage 200, a second beginning part of a normal demanded content may be stored in hard disk storage 300 and the remaining part of the normal demanded content may be stored in tape storage 400. A data amount of the initial beginning part stored in solid state disk storage 400 may be determined based on a maximum waiting time of a user, which is requested by the user. A data amount of the second beginning part stored in hard disk storage 300 may be determined based on a maximum access latency time to access the remaining part stored in tape storage 400. Such a maximum access latency time may differ according to a storage location of the remaining part in tape storage 400. The size of the remaining part stored in tape storage 400 may be determined by subtracting the first and second predetermined parts stored in solid state disk storage 400 and hard disk storage 300 form the total size of the content.

Furthermore, a buffering method of the distribution and buffering policy for the normal demanded content may be defined in an order of tape storage 400, first hard disk 301, . . . , $N^{th}$ hard disk 30N, and first solid state disk. The number of maximum sessions acceptable at a solid state disk may be determined as a result of dividing a solid state disk processing capability by a required transmit rate. The number of buffering solid state disks may be determined by a result of dividing the maximum access session number by the number of maximum sessions acceptable at each solid state disk. The number of maximum sessions acceptable at each hard disk may be determined as a result of dividing a hard disk processing capability by a required transmit rate. The number of buffering hard disks may be determined by a result of dividing the maximum access session number by the number of maximum sessions processable at each hard disk.

In case of a high demanded content (e.g., high transmission rate content), the distribution and buffering policy may be defined to store such a high demanded content distributedly through three storages: solid state disk storage 200, hard disk storage 300, and tape storage 400. For example, an initial beginning part of a high demanded content may be stored in solid state disk storage 200, a second beginning part of a high demanded content may be stored in hard disk storage 300 and the remaining part of the high demanded content may be stored in tape storage 400. Such a size of a first beginning part stored in solid state disk storage 400 may be determined based on a maximum waiting time of a user, which is requested by the user. A size of a second beginning part stored in hard disk storage 300 may be determined based on a maximum access latency time to access the remaining part stored in tape storage 400. Such a maximum access latency time may differ according to a storage location of the remaining part in tape storage 400. The size of the remaining part stored in tape storage 400 may be determined by subtracting the first and second predetermined parts stored in solid state disk storage 400 and hard disk storage 300 form the total size of the content.

Furthermore, a buffering order of the distribution and buffering policy for the normal demanded content may be defined in an order of tape storage 400, first hard disk 301, . . . , $N^{th}$ hard disk 30N, first solid state disk 401, . . . , to $N^{th}$ solid state disk 40N. The number of maximum sessions processable at a solid state disk may be determined as a result of dividing a solid state disk processing capability by a required transmit rate. The number of buffering solid state disks may be determined by a result of dividing the maximum access session number by the number of maximum sessions processable at each solid state disk. The number of maximum sessions processable at each hard disk may be determined as a result of dividing a hard disk processing capability by a required transmit rate. The number of buffering hard disks may be determined by a result of dividing the maximum access session number by the number of maximum sessions processable at each hard disk.

Hereinafter, a method of controlling and managing contents in a hierarchical storage system based on an inquiry frequency and a required minimum transmission rate of each content will be described with reference to FIG. 2 to FIG. 5.

Figure 2:
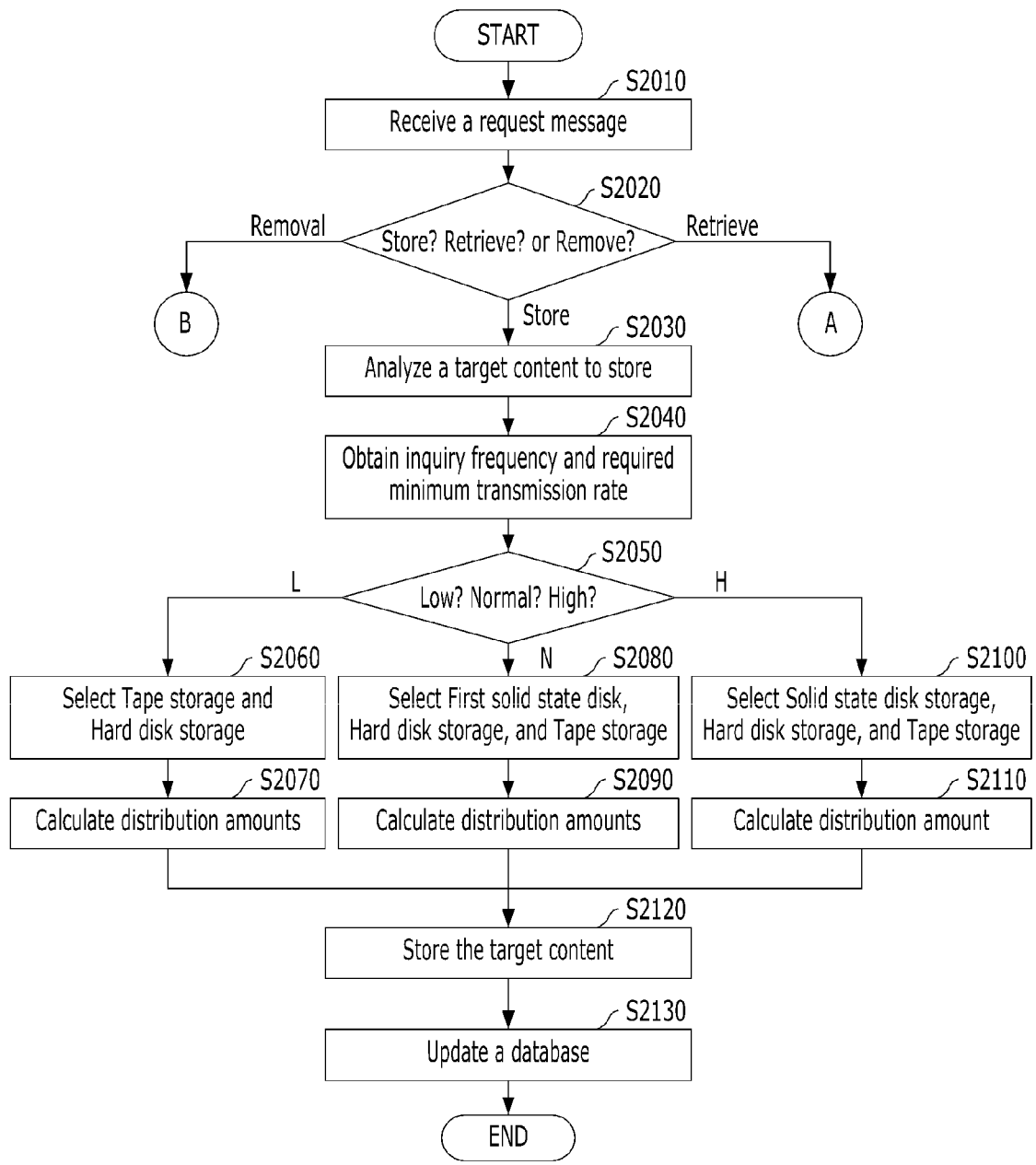
FIG. 2 illustrates a storing operation in a method of controlling storages in a hierarchical storage system in accordance with at least one embodiment.

FIG. 2 illustrates a storing operation in a method of controlling storages in a hierarchical storage system in accordance with at least one embodiment.

Referring to FIG. 2, a request message may be received at step S2010. For example, control server 100 may receive a request message from client device 600 through communication network 500. That is, client device 600 may transmit a request message to control server 100 for storing a predetermined target content in hierarchical storage system 100, retrieving a predetermined target content from hierarchical storage system 100, and remove a predetermined target content from hierarchical storage system 100. The request message may include information on identification of client device 600, information on a target content, and information on a distribution and buffer policy, but the present invention is not limited thereto.

In particular, client device 600 may execute a predetermined software program (e.g., application or App) and produce a graphic user interface that enables a user to access control server 100 through communication network 500. Through such a graphic user interface, the user may request control server 100 to store a predetermined content in, retrieve a predetermined content from, or remove a predetermine content from hierarchical storage system 100.

At step S2020, a type of the received request message may be determined. For example, control server 100 may analyze the received request message and determine a type of instruction, a target control, and identification of client device 600 based on the analysis result.

An authentication procedure may be performed between control server 100 and client device 600 after receiving the request message. In particular, control server 100 may request authentication data to client device 600 and client device 600 may provide the requested authentication data to control server 100. Based on the received authentication data, control server 100 may determine whether client device 600 has a legal right to access control server 100 and registered to use hierarchical storage system 10.

When the determined request type is a storing instruction (Store-S2020), information included in the request message may be analyzed at step S2030. For example, control server 100 may analyze information included in the received message and determine a target content to store and a distribution and buffering policy associated with client 600.

At step S2040, an inquiry frequency and a required minimum transmission rate may be obtained. For example, control server 100 may request hierarchical storage system 10 to provide information on the inquiry frequency and the required minimum transmission rate associated with the target object to store, but the present invention is not limited thereto. For example, control server 100 may store such information on the target object in own database in a memory (e.g., memory 120 in FIG. 5).

At step S2050, determination may be made whether the target content to store is a low demanded content, a normal demanded content, and a high demanded content based on the inquiry frequency associated with the target content or whether the target content to store is a low transmission rate content, a normal transmission rate content, or a high transmission rate content.

For determining a type of the target content based on an inquiry frequency, control server 100 may compare the obtained inquiry frequency with first and second demand level thresholds D1 and D2. The predetermined demand level thresholds D1 and D2 may be integer numbers set by at least one of a system designer, a service provider, an operator, and a user. The predetermined demand level thresholds may be references to determine whether a target content is a low demanded content, a normal demanded content, or a high demanded content. For example, the predetermined demand level thresholds may be decided based on an average frequency of entire contents in hierarchical storage system 10, but the present invention is not limited thereto. That is, control server 100 may determine i) the target content as a low demanded content when an inquiry frequency thereof is lower than first demand level threshold D1, ii) the target content as a normal demanded content when an inquiry frequency thereof is greater than first demand level D1 and lower than second demand level D2, and iii) the target content as a high demanded content when an inquiry frequency thereof is greater than second demand level D2.

For determining a type of the target content based on a required minimum transmission rate, control server 100 may compare the obtained required minimum transmission rate with first and second transmission rate thresholds T1 and T2.

The first and second transmission rate thresholds T1 and T2 may be integer numbers set by at least one of a system designer, a service provider, an operator, and a user. The first and second transmission rate thresholds T1 and T2 may be references to determine whether a target content is a low transmission rate content, a normal transmission rate content, or a high transmission rate content. For example, the predetermined first and second transmission rate thresholds T1 and T2 may be decided based on an average required transmission rate of entire contents in hierarchical storage system 10, but the present invention is not limited thereto. That is, control server 100 may determine i) the target content as a low transmission rate content when a required minimum transmission rate thereof is slower than first transmission rate threshold T1, ii) the target content as a normal transmission rate content when a required minimum transmission rate thereof is faster than first transmission rate threshold T1 and slower than second transmission rate threshold T2, and iii) the target content as a high transmission rate content when a required minimum transmission rate thereof is faster than second transmission rate threshold T2.

As described, the determination operation was described as using both of the inquiry frequency and the required minimum transmission rate of each content to decide a storing scheme, but the present invention is not limited thereto. For example, one of the inquiry frequency and the required minimum transmission rate may be selected and only the selected one is used to decide a storing scheme.

When the target content to store is determined as one of the low demanded content and the low transmission rate content (L-S2050), a tape storage and a hard disk storage may be selected at step S2060. For example, control server 100 may select tape storage 400 as a major storage device and hard disk storage 300 as a buffering storage based on the distribution and buffering policy. That is, the target content is divided into an initial buffering part and a remaining part and distributedly stored through tape storage 400 and hard disk storage 300. In particular, a predetermined beginning part of the target content may be stored in one of hard disks 301 to 30N in hard disk storage 300 as the initial buffering part and the remaining part of the target content may be stored in tape storage 400.

At step S2070, a data amount of the initial buffering part and the remaining part of the target content may be calculated. For example, control server 100 may determine the data amount of the initial buffering part to be stored in hard disk storage 300 may be calculated based on a maximum access latency time to access the remaining part of the target content stored in tape storage 400. Such a maximum access latency time may differ according to a storage location of the target content in tape storage 400. That is, the data amount of the initial buffering part is equivalent to a data amount that can be transmitted from hierarchical storage system 10 to client device 600 for the maximum access latency time. A data amount of the remaining part stored in tape storage 400 may be determined by subtracting the data amount of the initial buffering part form the total data amount of the target content.

At step S2120, the initial buffering part and the remaining part of the target content may be stored in hierarchical storage system 10. For example, control server 100 may store the calculated amount of the initial buffering part in the selected hard disk in hard disk storage 300 and the remaining part in tape storage 400.

At step S2130, a predetermined database may be updated based on the storing result. For example, control server 100 may update a predetermined database having information on all contents stored in hierarchical storage system 10 based on the storing result.

When the target content to store is determined as one of the normal demanded content and the normal transmission rate content (N-S2050), a first solid state disk in solid state disk storage 200, hard disk storage 300, and tape storage 400 may be selected at step S2080. For example, control server 100 may select tape storage 400 as a major storage device, one of hard disks 301 to 30N of hard disk storage 300 as a second buffering storage, and first solid state disk 201 of solid state disk storage 200 based on the distribution and buffering policy. That is, the target content is divided into an initial buffering part, a second buffering part, and a remaining part and distributedly stored through first solid state disk 201 of solid state disk storage 200, one of hard disks 301 to 30N of hard disk storage 300, and tape storage 400. In particular, a predetermined beginning part of the target content may be stored in first solid state disk 201 as the initial buffering part, a predetermined second beginning part of the target content may be stored in one of hard disks 301 to 30N in hard disk storage 300 as the second buffering part, and the remaining part of the target content may be stored in tape storage 400.

At step S2080, data amounts of the initial buffering part, the second buffering part, and the remaining part of the target content may be calculated. For example, control server 100 may determine the data amount of the initial buffering part may be calculated based on based on a maximum waiting time set by a user. The maximum waiting time may denote a maximum time acceptable for a user to wait for receiving the target content from hierarchical storage system 10. Such a maximum waiting time may be set by a user, but the present invention is not limited thereto. The second buffering part may be determined based on a maximum access latency time to access the remaining part of the target content stored in tape storage 400. Such a maximum access latency time may differ according to a storage location of the target content in tape storage 400. That is, the data amount of the initial buffering part is equivalent to a data amount that can be transmitted from hierarchical storage system 10 to client device 600 for the maximum access latency time. A data amount of the remaining part stored in tape storage 400 may be determined by subtracting the data amounts of the initial buffering part and the second buffering part form the total data amount of the target content.

At step S2120, the initial buffering part, the second buffering part, and the remaining part of the target content may be stored in hierarchical storage system 10. For example, control server 100 may store the calculated amount of the initial buffering part in first solid state disk 200, the calculated amount of the second buffering part in the selected hard disk in hard disk storage 300, and the remaining part in tape storage 400.

At step S2130, a predetermined database may be updated based on the storing result. For example, control server 100 may update a predetermined database having information on all contents stored in hierarchical storage system 10 based on the storing result.

When the target content to store is determined as one of the high demanded content and the high transmission rate content (N-S2050), solid state disk storage 200, hard disk storage 300, and tape storage 400 may be selected at step S2100. For example, control server 100 may select tape storage 400 as a major storage device, one of hard disks 301 to 30N of hard disk storage 300 as a second buffering storage, and one of solid state disks 201 to 20N of solid state disk storage 200 based on the distribution and buffering policy. That is, the target content is divided into an initial buffering part, a second buffering part, and a remaining part and distributedly stored through one of solid state disks 201 to 20N of solid state disk storage 200, one of hard disks 301 to 30N of hard disk storage 300, and tape storage 400. In particular, a predetermined beginning part of the target content may be stored in one of solid state disks 201 to 20N as the initial buffering part, a predetermined second beginning part of the target content may be stored in one of hard disks 301 to 30N in hard disk storage 300 as the second buffering part, and the remaining part of the target content may be stored in tape storage 400.

At step S2110, data amounts of the initial buffering part, the second buffering part, and the remaining part of the target content may be calculated. For example, control server 100 may determine the data amount of the initial buffering part may be calculated based on based on a maximum waiting time set by a user. The maximum waiting time may denote a maximum time acceptable for a user to wait for receiving the target content from hierarchical storage system 10. Such a maximum waiting time may be set by a user, but the present invention is not limited thereto. The second buffering part may be determined based on a maximum access latency time to access the remaining part of the target content stored in tape storage 400. Such a maximum access latency time may differ according to a storage location of the target content in tape storage 400. That is, the data amount of the initial buffering part is equivalent to a data amount that can be transmitted from hierarchical storage system 10 to client device 600 for the maximum access latency time. A data amount of the remaining part stored in tape storage 400 may be determined by subtracting the data amounts of the initial buffering part and the second buffering part form the total data amount of the target content.

At step S2120, the initial buffering part, the second buffering part, and the remaining part of the target content may be stored in hierarchical storage system 10. For example, control server 100 may store the calculated amount of the initial buffering part in a selected solid state disk in solid state disk storage 200, the calculated amount of the second buffering part in the selected hard disk in hard disk storage 300, and the remaining part in tape storage 400.

At step S2130, a predetermined database may be updated based on the storing result. For example, control server 100 may update a predetermined database having information on all contents stored in hierarchical storage system 10 based on the storing result.

Figure 3:
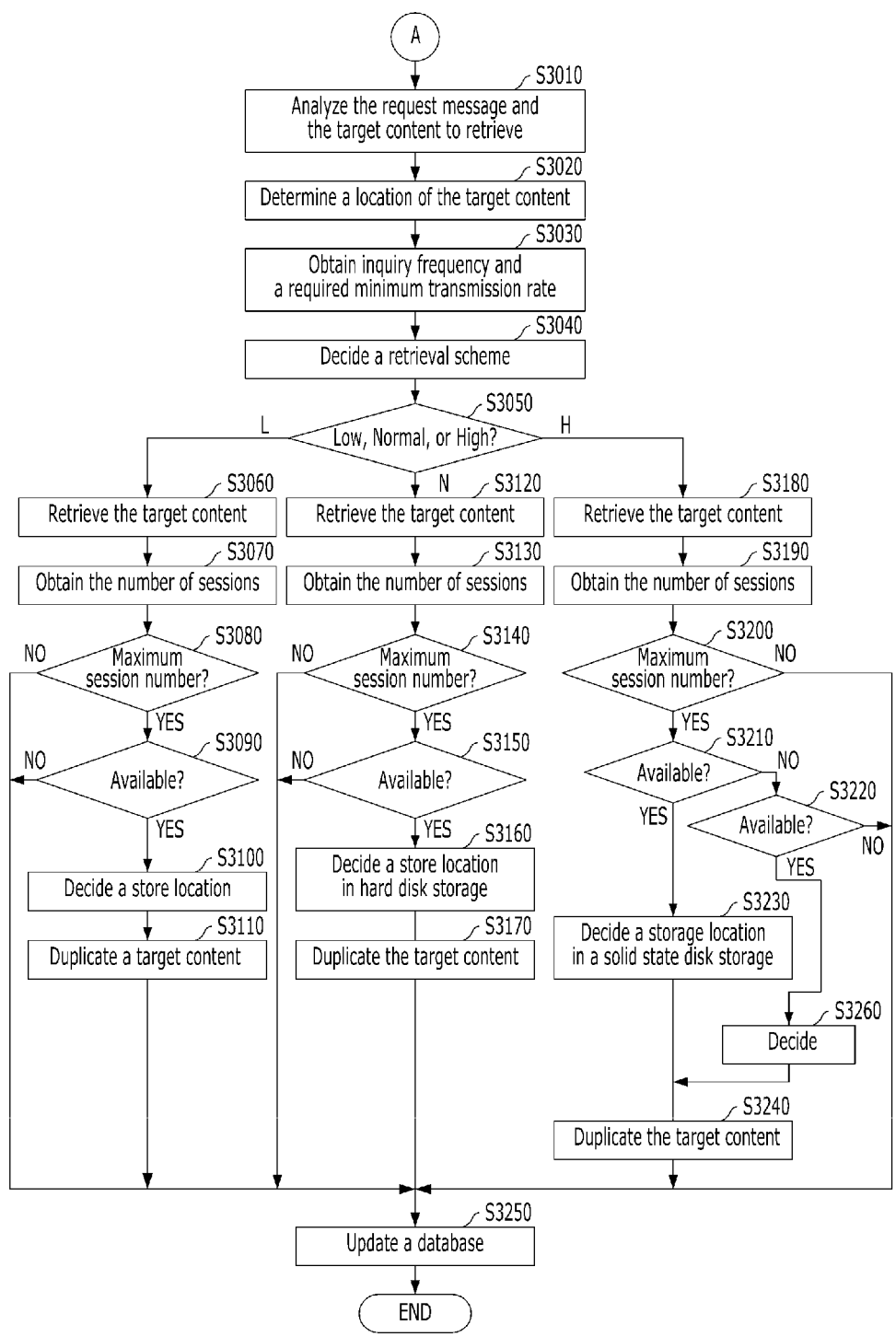
FIG. 3 illustration a retrieving operation in a method of controlling storages in a hierarchical storage system in accordance with at least one embodiment.

FIG. 3 illustration a retrieving operation in a method of controlling storages in a hierarchical storage system in accordance with at least one embodiment.

Referring to FIG. 3, when the received request message is a retrieving request (Retrieve-S2020 in FIG. 2), the request message may be analyzed at step S3010. For example, control server 100 may determine a target content to retrieve by analyzing the request message. The request message from client device 600 may include information on a type of a request, a target content to retrieve, a storing location of the target content, a distribution and buffering policy, and so forth.

At step S3020, a location of the target content may be determined. For example, control server 100 may determine a storing location of the target content in hierarchical storage system 10 based on the analysis result.

At step S3030, an inquiry frequency and a required minimum transmission rate of the target content may be obtained. For example, control server 100 may obtain the inquiry frequency and the required minimum transmission rate of the target content based on information stored in a database of a memory (e.g., memory 120 in FIG. 5).

At step S3040, a retrieval scheme of the target object may be decided. For example, control server 100 may decide a retrieval scheme of the target object based on at least one of the inquiry frequency and the required minimum transmission rate, and the distribution and buffering policy. Furthermore, control server 100 may decide a buffering scheme after retrieving the target content based on the distribution and buffering policy.

At step S3050, determination may be made whether the target content to store is a low demanded content, a normal demanded content, and a high demanded content based on the inquiry frequency associated with the target content or whether the target content to store is a low transmission rate content, a normal transmission rate content, or a high transmission rate content. For determining a type of the target content based on an inquiry frequency, control server 100 may compare the obtained inquiry frequency with first and second demand level thresholds D1 and D2. The predetermined demand level thresholds D1 and D2 may be integer numbers set by at least one of a system designer, a service provider, an operator, and a user. The predetermined demand level thresholds may be references to determine whether a target content is a low demanded content, a normal demanded content, or a high demanded content. For example, the predetermined demand level thresholds may be decided based on an average frequency of entire contents in hierarchical storage system 10, but the present invention is not limited thereto. That is, control server 100 may determine i) the target content as a low demanded content when an inquiry frequency thereof is lower than first demand level threshold D1, ii) the target content as a normal demanded content when an inquiry frequency thereof is greater than first demand level D1 and lower than second demand level D2, and iii) the target content as a high demanded content when an inquiry frequency thereof is greater than second demand level D2.

For determining a type of the target content based on a required minimum transmission rate, control server 100 may compare the obtained required minimum transmission rate with first and second transmission rate thresholds T1 and T2. The first and second transmission rate thresholds T1 and T2 may be integer numbers set by at least one of a system designer, a service provider, an operator, and a user. The first and second transmission rate thresholds T1 and T2 may be references to determine whether a target content is a low transmission rate content, a normal transmission rate content, or a high transmission rate content. For example, the predetermined first and second transmission rate thresholds T1 and T2 may be decided based on an average required transmission rate of entire contents in hierarchical storage system 10, but the present invention is not limited thereto. That is, control server 100 may determine i) the target content as a low transmission rate content when a required minimum transmission rate thereof is slower than first transmission rate threshold T1, ii) the target content as a normal transmission rate content when a required minimum transmission rate thereof is faster than first transmission rate threshold T1 and slower than second transmission rate threshold T2, and iii) the target content as a high transmission rate content when a required minimum transmission rate thereof is faster than second transmission rate threshold T2.

When the target object is at least one of a low demanded content and a low transmission rate content (L-S3050), the target content may be retrieved from hierarchical storage system according to the distribution and buffering policy at step S3060. For example, control server 100 may retrieve and transmit an initial buffering part stored in hard disk storage 300 to client device 600 and, at the same time, move the remaining part stored in tape storage 300 to one of hard disks 301 to 30N of hard disk storage 300. After completely transmitting all of the initial buffering part, control server 100 may continuously transmit the remaining part moved in hard disk storage 300 to client device 600. After retrieving, a session number of a corresponding hard disk increases by one.

At step S3070, the number of sessions established with a hard disk storing the target content may be obtained. For example, control server 100 may determine the number of sessions established with a hard disk storing the target content from hierarchical storage system 300.

At step S3080, determination may be made so as whether the obtained session number reaches the maximum session number acceptable to the hard disk. For example, control server 100 may determine whether the obtained session number reaches the maximum session number of the hard disk. The maximum session number acceptable to the hard disk can be determined as a result obtained by dividing a hard disk processing capability by a required transmission rate. In addition, the number of hard disks for buffering may be determined as a result obtained dividing the maximum access session number of hard disk storage 300 by a maximum processable session number of each hard disk.

When the obtained session number does not reach the maximum session number (No-S3080), a database for information on contents stored in hierarchical storage system 10 may be updated based on a result of retrieving the target content at step S3250. For example, control server 100 may update the database with the information on the retrieved target content.

When the obtained session number reaches the maximum session number (Yes-S3090), determination may be made so as whether hard disk storage 300 includes an available hard disk at step S3100. For example, control server 100 may determine whether hard disk storage 300 includes an available hard disk by requesting necessary information to hierarchical storage system 10. The number of hard disks for buffering may be determined as a result obtained dividing the maximum access session number of hard disk storage 300 by a maximum processable session number of each hard disk.

When hard disk storage 300 does not have available hard disks (No-S3090), a database for information on contents stored in hierarchical storage system 10 may be updated based on a result of retrieving the target content at step S3250. For example, control server 100 may update the database with the information on the retrieved target content.

When hard disk storage 300 has available hard disks (No-S3090), one of available hard disks may be selected at step S3100. For example, control server 100 may select one of available hard disks for buffering based on a predetermined order, for example $1^{st}$ hard disk 301 to $n^{th}$ hard disk 30N. That is, when the target content is stored in $N^{th}$ hard disk, a $(n+1)^{th}$ hard disk may be selected, but the present invention is not limited thereto.

At step S3110, the target content may be duplicated to the selected hard disk. For example, control server 100 may duplicate the target content to the selected hard disk. At step S3250, a database for information on contents stored in hierarchical storage system 10 may be updated based on a result of retrieving the target content. For example, control server 100 may update the database with the information on the retrieved target content.

When the target object is at least one of a normal demanded content and a normal transmission rate content (L-S3050), the target content may be retrieved from hierarchical storage system according to the distribution and buffering policy at step S3120. For example, control server 100 may i) retrieve and transmit an initial buffering part stored in first solid state disk 201, ii) continuously transmit a second buffering part stored in hard disk storage 300 to client device 600 after completely transmitting the initial buffering part, and, iii) at the same time, move the remaining part stored in tape storage 400 to one of hard disks 301 to 30N of hard disk storage 300. After completely transmitting all of the initial buffering part, iv) control server 100 may continuously transmit the remaining part moved in hard disk storage 300 to client device 600. After retrieving, a session number of a corresponding hard disk increases by one.

At step S3130, the number of sessions established with a hard disk storing the target content may be obtained. For example, control server 100 may determine the number of sessions established with a hard disk storing the target content from hierarchical storage system 300.

At step S31340, determination may be made so as whether the obtained session number reaches the maximum session number acceptable to the hard disk. For example, control server 100 may determine whether the obtained session number reaches the maximum session number of the hard disk. The maximum session number acceptable to the hard disk can be determined as a result obtained by dividing a hard disk processing capability by a required transmission rate. In addition, the number of hard disks for buffering may be determined as a result obtained dividing the maximum access session number of hard disk storage 300 by a maximum processable session number of each hard disk.

When the obtained session number does not reach the maximum session number (No-S3140), a database for information on contents stored in hierarchical storage system 10 may be updated based on a result of retrieving the target content at step S3250. For example, control server 100 may update the database with the information on the retrieved target content.

When the obtained session number reaches the maximum session number (Yes-S3140), determination may be made so as whether hard disk storage 300 includes an available hard disk at step S3150. For example, control server 100 may determine whether hard disk storage 300 includes an available hard disk by requesting necessary information to hierarchical storage system 10. The number of hard disks for buffering may be determined as a result obtained dividing the maximum access session number of hard disk storage 300 by a maximum processable session number of each hard disk.

When hard disk storage 300 does not have available hard disks (No-S3150), a database for information on contents stored in hierarchical storage system 10 may be updated based on a result of retrieving the target content at step S3250. For example, control server 100 may update the database with the information on the retrieved target content.

When hard disk storage 300 has available hard disks (No-S3150), one of available hard disks may be selected at step S3160. For example, control server 100 may select one of available hard disks for buffering based on a predetermined order, for example $1^{st}$ hard disk 301 to $n^{th}$ hard disk 30N. That is, when the target content is stored in $N^{th}$ hard disk, a $(n+1)^{th}$ hard disk may be selected, but the present invention is not limited thereto.

At step S3170, the target content may be duplicated to the selected hard disk. For example, control server 100 may duplicate the target content to the selected hard disk. At step S3250, a database for information on contents stored in hierarchical storage system 10 may be updated based on a result of retrieving the target content. For example, control server 100 may update the database with the information on the retrieved target content.

When the target object is at least one of a high demanded content and a high transmission rate content (L-S3050), the target content may be retrieved from hierarchical storage system according to the distribution and buffering policy at step S3180. For example, control server 100 may i) retrieve and transmit an initial buffering part stored in solid state disk storage 200, ii) at the same time, move a second buffering part stored in hard disk storage 300 to one solid state disks 201 to 20N of solid state disk storage 200, iii) at the same time, move the remaining part stored in tape storage 400 to one of hard disks 301 to 30N of hard disk storage 300. After completely transmitting all of the initial buffering part, iv) control server 100 may continuously transmit the second beginning part and the remaining part moved in solid state disk storage 200 and hard disk storage 300 to client device 600. After retrieving, a session number of a corresponding hard disk increases by one.

At step S3190, the number of sessions established with a solid state disk storing the target content may be obtained. For example, control server 100 may determine the number of sessions established with a solid state disk storing the target content from hierarchical storage system 300.

At step S3200, determination may be made so as whether the obtained session number reaches the maximum session number acceptable to the solid state disk. For example, control server 100 may determine whether the obtained session number reaches the maximum session number of the solid state disk. The maximum session number acceptable to the solid state disk can be determined as a result obtained by dividing a solid state disk processing capability by a required transmission rate. In addition, the number of solid state disks for buffering may be determined as a result obtained dividing the maximum access session number of solid state disk storage 200 by a maximum processable session number of each solid state disk. The maximum session number acceptable to the hard disk can be determined as a result obtained by dividing a hard disk processing capability by a required transmission rate. In addition, the number of hard disks for buffering may be determined as a result obtained dividing the maximum access session number of hard disk storage 300 by a maximum processable session number of each hard disk.

When the obtained session number does not reach the maximum session number (No-S3200), a database for information on contents stored in hierarchical storage system 10 may be updated based on a result of retrieving the target content at step S3250. For example, control server 100 may update the database with the information on the retrieved target content.

When the obtained session number reaches the maximum session number (Yes-S3200), determination may be made so as whether solid state disk storage 200 includes an available solid state disk at step S3210. For example, control server 100 may determine whether solid state disk storage 200 includes an available solid state disk by requesting necessary information to hierarchical storage system 10. The number of solid state disks for buffering may be determined as a result obtained dividing the maximum access session number of solid state disk storage 200 by a maximum processable session number of each solid state disk.

When solid state disk storage 200 has available solid state disks (No-S3210), one of available solid state disks may be selected at step S3230. For example, control server 100 may select one of available solid state disks for buffering based on a predetermined order, for example $1^{st}$ solid state disk 201 to $n^{th}$ solid state disk 20N. That is, when the target content is stored in $x^{th}$ solid disk, a $(x+1)^{th}$ solid state disk may be selected, but the present invention is not limited thereto.

At step S3240, the target content may be duplicated to the selected solid state disk. For example, control server 100 may duplicate the target content to the selected solid state disk. At step S3250, a database for information on contents stored in hierarchical storage system 10 may be updated based on a result of retrieving the target content. For example, control server 100 may update the database with the information on the retrieved target content.

When hard disk storage 300 does not have available solid state disks (No-S3210), determination may be made so as whether hard disk storage 300 includes an available hard disk at step S3220. For example, control server 100 may determine whether hard disk storage 300 includes an available hard disk by requesting necessary information to hierarchical storage system 10. The number of hard disks for buffering may be determined as a result obtained dividing the maximum access session number of hard disk storage 300 by a maximum processable session number of each hard disk.

When hard disk storage 300 does not have available hard disks (No-S3220), a database for information on contents stored in hierarchical storage system 10 may be updated based on a result of retrieving the target content at step S3250. For example, control server 100 may update the database with the information on the retrieved target content.

When hard disk storage 300 has available hard disks (No-S3220), one of available hard disks may be selected at step S3260. For example, control server 100 may select one of available hard disks for buffering based on a predetermined order, for example $1^{st}$ hard disk 301 to $n^{th}$ hard disk 30N. That is, when the target content is stored in $N^{th}$ hard disk, a $(n+1)^{th}$ hard disk may be selected, but the present invention is not limited thereto.

At step S3240, the target content may be duplicated to the selected hard disk. For example, control server 100 may duplicate the target content to the selected hard disk. At step S3250, a database for information on contents stored in hierarchical storage system 10 may be updated based on a result of retrieving the target content. For example, control server 100 may update the database with the information on the retrieved target content.

Figure 4:
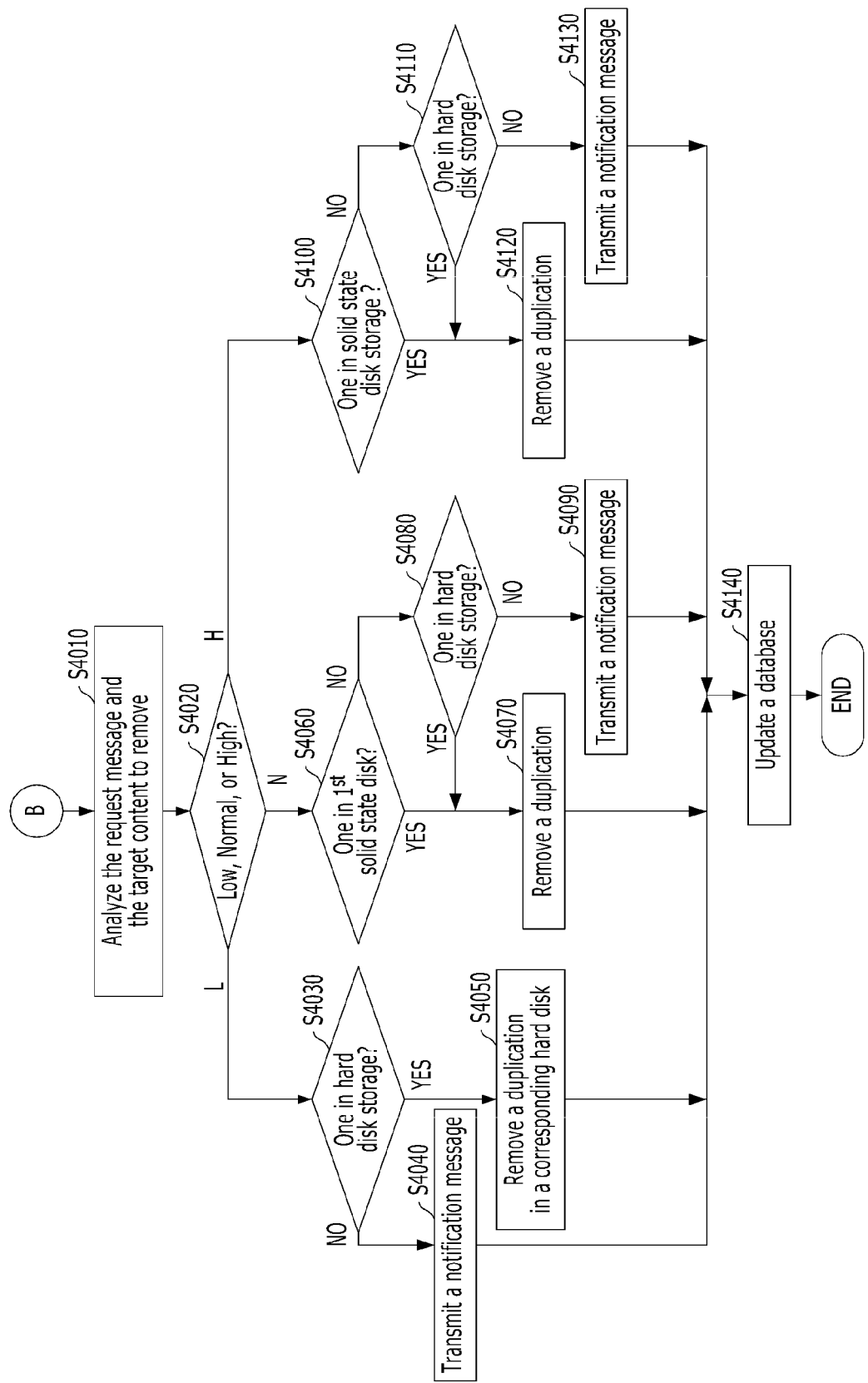
FIG. 4 illustrates a removal operation in a method of controlling storages in a hierarchical storage system in accordance with at least one embodiment.

FIG. 4 illustrates a removal operation in a method of controlling storages in a hierarchical storage system in accordance with at least one embodiment.

Referring to FIG. 4, when the received request message is a removal request (Remove-S2020 in FIG. 2), the request message may be analyzed at step S4010. For example, control server 100 may determine a target content to remove by analyzing the request message. The request message from client device 600 may include information on a type of a request, a target content to remove, a storing location of the target content, a distribution and buffering policy, and so forth.

At step S4020, determination may be made whether the target content to remove is a low demanded content, a normal demanded content, and a high demanded content based on the inquiry frequency associated with the target content or whether the target content to store is a low transmission rate content, a normal transmission rate content, or a high transmission rate content.

When the target object is at least one of a low demanded content and a low transmission rate content (L-S4020), determination may be made so as whether the target content is stored in one of hard disks 301 to 30N in hard disk storage 300 at step S4030. For example, control server 100 determines whether the target content is stored in one of hard disks 301 to 30N in hard disk storage 300.

When the target content is stored in one of hard disks 301 to 30N in hard disk storage 300 (Yes-S4030), one of hard disks storing a duplication of the target content is selected and the duplicated in the selected one may be removed at step S4050. For example, control server 100 may select one of hard disks storing a duplication of the target content based on an order of $N^{th}$ hard disk to $1^{st}$ hard disk, but the present invention is not limited thereto. Then, control server 100 may remove the duplication of the target content stored in the selected hard disk.

When the target content is not stored in one of hard disks 301 to 30N in hard disk storage 300 (No-S4030), a notification message may be transmitted to client device 600. For example, when the target content is not stored in one of hard disks, control server 100 may determine only one target content is stored in hierarchical storage system 10. Accordingly, control server 100 may generate a notification message to inform client device 600.

When the target object is at least one of a normal demanded content and a normal transmission rate content (N-S4020), determination may be made so as whether the target content is stored in one of hard disks 301 to 30N in hard disk storage 300 at step S4030. For example, control server 100 determines whether the target content is stored in one of hard disks 301 to 30N in hard disk storage 300.

When the target content is stored in one of hard disks 301 to 30N in hard disk storage 300 (Yes-S4030), one of hard disks storing a duplication of the target content is selected and the duplicated in the selected one may be removed at step S4050. For example, control server 100 may select one of hard disks storing a duplication of the target content based on an order of $N^{th}$ hard disk to $1^{st}$ hard disk, but the present invention is not limited thereto. Then, control server 100 may remove the duplication of the target content stored in the selected hard disk.

When the target content is not stored in one of hard disks 301 to 30N in hard disk storage 300 (No-S4030), a notification message may be transmitted to client device 600. For example, when the target content is not stored in one of hard disks, control server 100 may determine only one target content is stored in hierarchical storage system 10. Accordingly, control server 100 may generate a notification message to inform client device 600.

When the target object is at least one of a normal demanded content and a normal transmission rate content (N-S4020), determination may be made so as whether the target content is stored in first solid state disk 201 in solid state disk storage 200 at step S4060. For example, control server 100 determines whether the target content is stored in first solid state disk 201 in solid state disk storage 200.

When the target content is stored in first solid state disk 201 in solid state disk storage 200 (Yes-S4060), the duplicated in first solid state disk 201 may be removed at step S4070. For example, control server 100 may remove the duplication of the target content stored in first solid state disk 201.

When the target content is not stored in first solid state disk 201 in solid state disk storage 200 (No-S4060), determination may be made so as whether the target content is stored in one of hard disks 301 to 30N in hard disk storage 300 at step S4080. For example, control server 100 determines whether the target content is stored in one of hard disks 301 to 30N in hard disk storage 300.

When the target content is stored in one of hard disks 301 to 30N in hard disk storage 300 (Yes-S4080), one of hard disks storing a duplication of the target content is selected and the duplicated in the selected one may be removed at step S4070. For example, control server 100 may select one of hard disks storing a duplication of the target content based on an order of $N^{th}$ hard disk to $1^{st}$ hard disk, but the present invention is not limited thereto. Then, control server 100 may remove the duplication of the target content stored in the selected hard disk.

When the target content is not stored in one of hard disks 301 to 30N in hard disk storage 300 (No-S4080), a notification message may be transmitted to client device 600 at step S4090. For example, when the target content is not stored in one of hard disks, control server 100 may determine only one target content is stored in hierarchical storage system 10. Accordingly, control server 100 may generate a notification message to inform client device 600.

When the target object is at least one of a high demanded content and a high transmission rate content (N-S4020), determination may be made so as whether the target content is stored in one of solid state disks 201 to 20N in solid state disk storage 200 at step S4100. For example, control server 100 determines whether the target content is stored in one of solid state disks 201 to 20N in solid state disk storage 200.

When the target content is stored in one of solid state disks 201 to 20N in solid state disk storage 200 (Yes-S4100), the duplication in one of one of solid state disks 201 to 20N may be removed at step S4070. For example, control server 100 may select one of solid state disks having the duplication and remove the duplication of the target content stored in the selected solid state disk.

When the target content is not stored in one of solid state disks 201 to 20N in solid state disk storage 200 (No-S4100), determination may be made so as whether the target content is stored in one of hard disks 301 to 30N in hard disk storage 300 at step S4110. For example, control server 100 determines whether the target content is stored in one of hard disks 301 to 30N in hard disk storage 300.

When the target content is stored in one of hard disks 301 to 30N in hard disk storage 300 (Yes-S4110), one of hard disks storing a duplication of the target content is selected and the duplicated in the selected one may be removed at step S4120. For example, control server 100 may select one of hard disks storing a duplication of the target content based on an order of $N^{th}$ hard disk to $1^{st}$ hard disk, but the present invention is not limited thereto. Then, control server 100 may remove the duplication of the target content stored in the selected hard disk.

When the target content is not stored in one of hard disks 301 to 30N in hard disk storage 300 (No-S4110), a notification message may be transmitted to client device 600 at step S4130. For example, when the target content is not stored in one of hard disks, control server 100 may determine only one target content is stored in hierarchical storage system 10. Accordingly, control server 100 may generate a notification message to inform client device 600. At step S4140, a database may be updated with information on the removal of the target content.

Figure 5:
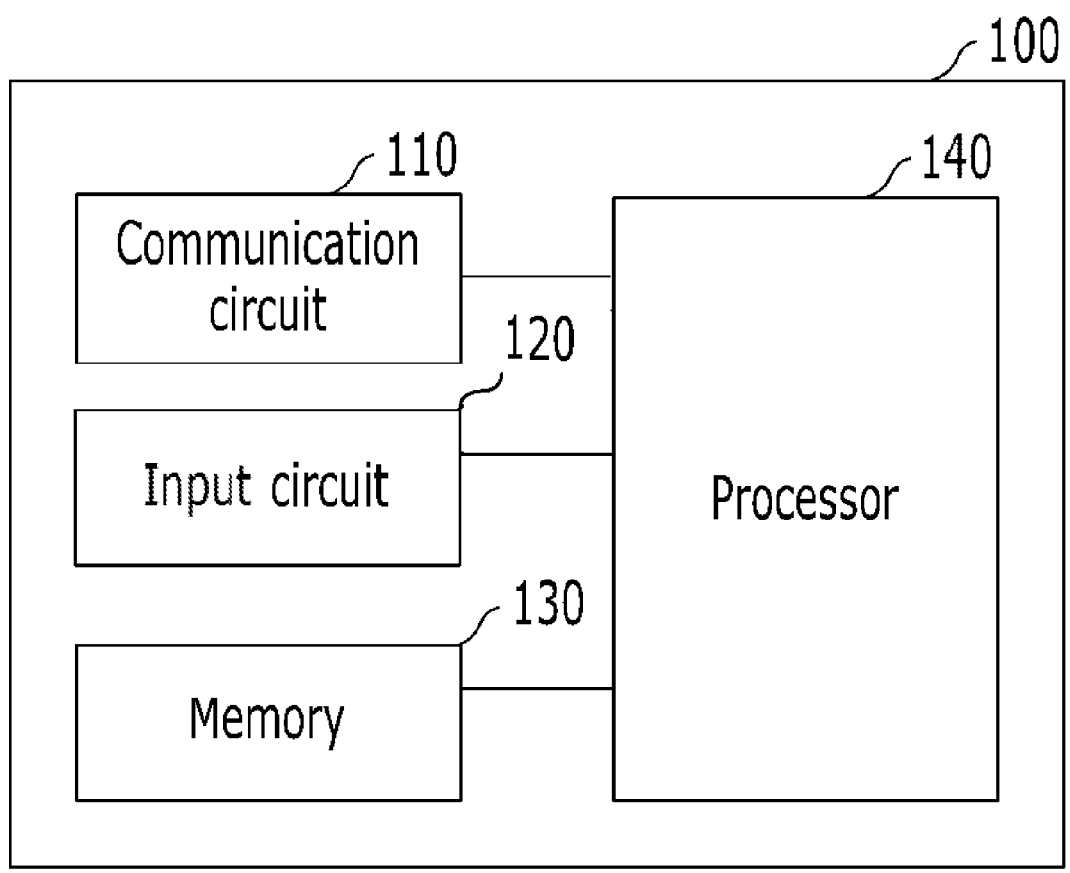
FIG. 5 illustrates a control server in accordance with at least one embodiment.

FIG. 5 illustrates a control server in accordance with at least one embodiment.

Referring to FIG. 5, control device 100 may include communication circuit 110, input/output circuit 120, memory 130, and processor 140. Communication circuit 110 may be a circuitry for enabling control server 100 to communicate with hierarchical storage system 10 and other entities such as client device 600 through communication network 500 based on various types of communication schemes. For example, communication circuit 110 may be referred to as a transceiver or a transmitter—receiver. In general, communication circuit 110 may transmit data to or receive data from other entities coupled to communication network 500. For convenience and ease of understanding, service server 100 is illustrated as having one communication circuit in FIG. 5, but the present invention is not limited thereto. For example, service server 100 may include more than two communication circuits each employing different communication scheme. Communication circuit 110 may include at least one of a mobile communication circuit, a wireless internet circuit, a near field communication (NFC) circuit, a global positioning signal receiving circuit, and so forth. Particularly, communication circuit 110 may include a short distance communication circuit for short distance communication, such as NFC, and a mobile communication circuit for long range communication through a mobile communication network, such as long term evolution (LTE) communication or wireless data communication (e.g., WiFi). In accordance with at least one embodiment, communication circuit 110 may receive a storing request message, a retrieval request message, and a remove request message from client device 600 through communication network 500.

Input/output circuit 120 may be a circuitry for enabling control server 100 to receive a user input and output a result of processing a predetermined operation in response to the user input. For example, input/output circuit 120 may include a touch screen, a display, a keyboard, a button, a speaker, and so forth. In accordance with at least one embodiment, input/output circuit 120 may receive a user input directly from a user or an operator. Such a user input may include a storing request input, a retrieval request input, and a remove request input.

Memory 130 may be a circuitry for storing various types of digital data including an operating system, at least one application, information and data necessary for performing operations. Memory 130 may store and manage a database having information on contents stored in hierarchical storage system 100. In addition, memory 130 may store a distribution and buffering policy to distributedly store and manage massive contents in hierarchical storage system 10.

Processor 140 may be a central processing unit (CPU) that carries out the instructions of a predetermined program stored in memory 130 by performing basic arithmetic, logical, control and input/output operations specified by the instructions. In accordance with at least one embodiment, processor 140 of control server 100 may perform various types of operations to control and manage hierarchical storage system 10. Such operations of processor 140 were described in detail with reference to FIG. 2 to FIG. 4. Accordingly, the operations of processor 140 will be briefly described herein.

Processor 140 may perform operation for storing a target content in hierarchical storage system 10. For example, processor 140 may perform an operation for determining whether a type of a received request message content is one of a storing request, a retrieval request, and a removal request, for analyzing a target content based on information included in the request message, for obtaining an inquiry frequency and a required minimum transmission rate of the target object.

Processor 140 may also perform operation for determining whether a target content is one of a less demanded content, a normal demanded content, and a high demanded content, or one of a low transmission rate content, a normal transmission rate content, and a high transmission rate content, based on an inquiry frequency and a required minimum transmission rate. Processor 130 may decide a storing scheme based on the determination result and a distribution and buffering policy stored in memory 130. Processor 140 may perform an operation for selecting at least one of solid state disk storage 200, hard disk storage 300, and tape storage 400 and for calculating data amounts of an initial beginning part, a second beginning part, and the remaining part of the target content. Since such operation was described with reference to FIG. 2, the detailed description thereof will be omitted herein.

Processor 140 may perform operation for retrieving a target content from hierarchical storage system 100. For example, processor 140 may perform operation for analyzing the request message and the target content to retrieve, detecting a location of the target content, obtaining an inquiry frequency and a required minimum transmission rate of the target content, and deciding a retrieval scheme based on the inquiry frequency and the required minimum transmission rate of the target content and the distribution and buffering policy. Processor 140 may perform operation for detecting the session number of a corresponding storage and for selecting one of available storages for buffering based on the detected session number and the distribution and buffering policy. Since such operation was described with reference to FIG. 3, the detailed description thereof will be omitted herein.

Processor 140 may perform operations for removing a target content from hierarchical storage system 10. For example, processor 140 may perform operations for determining whether a target content to remove is one of a less demanded content, a normal demanded content, and a high demanded content, or one of a low transmission rate content, a normal transmission rate content, and a high transmission rate content, based on an inquiry frequency and a required minimum transmission rate. Processor 130 may perform operation for deciding a removal scheme based on the determination result and a distribution and buffering policy stored in memory 130. Since such removal and buffering operation was described in detail in reference with FIG. 4, detailed description thereof will be omitted herein.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a control server and the control server can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of distributedly storing an individual content in a hierarchical storage system including a solid state storage having a plurality of solid state disks, a hard disk storage having a plurality of hard disks, and a tape storage, the method comprising:
    determining a target content to store and an inquiry frequency and a required minimum transmission rate of the target content upon receipt of a request message from a client device;
    classifying the target content as at least one of a low demanded content, a normal demanded content, a high demanded content, a low transmission rate content, a normal transmission rate content, and a high transmission rate content based on the inquiry frequency and the required minimum transmission rate of the target content; and
    distributedly storing the target content through at least one of the solid state storage, the hard disk storage, and the tape storage based on the classification result and a distribution and buffering policy.

2. The method of claim 1, wherein the determining a target content comprises:
    receiving the request message from the client device through a communication network;
    analyzing the received request messages and extracting information on the target content to store from the received request message based on the analysis result; and
    obtaining the inquiry frequency and the required minimum transmission rate of the target content from the hierarchical storage system.

3. The method of claim 1, wherein the classifying comprises:
    comparing the inquiry frequency of the target content with a first demand level threshold and a second demand level threshold;
    determining the target content as the low demanded content when the inquiry frequency of the target content is smaller than the first demand level threshold;
    determining the target content as the normal demanded content when the inquiry frequency of the target content is greater than the first demand level threshold and smaller than the second demand level threshold; and
    determining the target content as the high demanded content when the inquiry frequency of the target content is greater than the second demand level threshold.

4. The method of claim 3, wherein the first demand level threshold and the second demand level threshold are set based on an average inquiry frequency of entire contents stored in the hierarchical storage system.

5. The method of claim 1, wherein the classifying comprises:
    comparing the required minimum transmission rate of the target content with a first transmission rate threshold and a second transmission rate threshold;
    determining the target content as the low demanded content when the required minimum transmission rate of the target content is smaller than the first transmission rate threshold;
    determining the target content as the normal demanded content when the required minimum transmission rate of the target content is greater than the first transmission rate threshold and smaller than the second transmission rate threshold; and
    determining the target content as the high demanded content when the required minimum transmission rate of the target content is greater than the second transmission rate threshold.

6. The method of claim 5, wherein the first transmission rate threshold and the second transmission rate threshold are set based on an average the required minimum transmission rate of entire contents stored in the hierarchical storage system.

7. The method of claim 1, wherein when the target content is classified to at least one of the low demanded content and the low transmission rate content, the distributedly storing comprises:
    dividing the target content into an initial beginning part and a remaining part;
    selecting one of available hard disks in the hard disk storage;
    storing the initial beginning part in the selected hard disk in the hard disk storage; and
    storing the remaining part in the tape storage.

8. The method of claim 7, comprising:
    calculating a data amount of the initial beginning part based on a maximum access latency to access the remaining part stored in the tap storage.

9. The method of claim 1, wherein when the target content is classified to at least one of the normal demanded content and the normal transmission rate content, the distributedly storing comprises:
    dividing the target content into an initial beginning part, a second beginning part, a remaining part;
    selecting one of available hard disks in the hard disk storage;
    storing the initial beginning part in a first solid state disk in the solid state disk storage;
    storing the second beginning part in the selected hard disk in the hard disk storage; and
    storing the remaining part in the tape storage.

10. The method of claim 1, wherein when the target content is classified to at least one of the high demanded content and the high transmission rate content, the distributedly storing comprises:
    dividing the target content into an initial beginning part, a second beginning part, a remaining part;
    selecting one of available solid state disks in the solid state storage;

selecting one of available hard disks in the hard disk storage;
storing the initial beginning part in the selected solid state disk in the solid state disk storage;
storing the second beginning part in the selected hard disk in the hard disk storage; and
storing the remaining part in the tape storage.

11. The method of claim 10, comprising:
calculating a data amount of the initial beginning part based on a maximum waiting time of the client device; and
calculating a data amount of the second beginning part based on a maximum access latency to access the remaining part stored in the tap storage.

12. A method of retrieving an individual content distributedly stored in a hierarchical storage system including a solid state storage having a plurality of solid state disks, a hard disk storage having a plurality of hard disks, and a tape storage, the method comprising:
determining a target content to retrieve and an inquiry frequency and a required minimum transmission rate of the target content upon receipt of a request message from a client device;
classifying the target content as at least one of a low demanded content, a normal demanded content, a high demanded content, a low transmission rate content, a normal transmission rate content, and a high transmission rate content based on the inquiry frequency and the required minimum transmission rate of the target content; and
retrieving the target content from at least one of the solid state storage, the hard disk storage, and the tape storage based on the classification result and a distribution and buffering policy.

13. The method of claim 12, wherein when the target content is classified to at least one of the low demanded content and the low transmission rate content, the retrieving the target content comprises:
retrieving an initial beginning part stored in one of hard disks in the hard disk storage and providing the retrieved initial beginning part to the client device;
moving a remaining part stored in the tape storage to one of hard disks in the hard disk storage while retrieving the initial beginning part; and
after completely retrieving the initial beginning part, continuously retrieving the moved remaining part from the hard disk storage and providing the retrieved remaining part to the client device.

14. The method of claim 13, comprising:
determining whether a session number of a hard disk storing the remaining part reaches a maximum session number;
selecting one of available hard disks in the hard disk storage; and
duplicating the target object in the selected hard disk.

15. The method of claim 12, wherein when the target content is classified to at least one of the normal demanded content and the normal transmission rate content, the retrieving the target content comprises:
retrieving an initial beginning part stored in a first solid state disk in the solid state disk storage and providing the retrieved initial beginning part to the client device;
continuously retrieving a second beginning part stored in one of hard disks in the hard disk storage and providing the retrieved initial beginning part to the client device;
moving a remaining part stored in the tape storage to one of hard disks in the hard disk storage while retrieving the second beginning part; and
after completely retrieving the second beginning part, continuously retrieving the moved remaining part from the hard disk storage and providing the retrieved remaining part to the client device.

16. The method of claim 12, wherein when the target content is classified to at least one of the high demanded content and the high transmission rate content, the retrieving the target content comprises:
retrieving an initial beginning part stored in one of solid state disks in the solid state disk storage and providing the retrieved initial beginning part to the client device;
moving a second beginning part stored in one of hard disks in the hard disk storage to one of solid state disks in the solid state disk storage while retrieving the initial beginning part;
continuously retrieving the moved second beginning part stored in the solid state disk storage and providing the retrieved second beginning part to the client device;
moving a remaining part stored in the tape storage to one of hard disks in the hard disk storage, and to one of solid state disks in the solid state storage while retrieving the initial beginning part and the second beginning part;
after completely retrieving the second beginning part, continuously retrieving the moved remaining part from the solid state disk storage and providing the retrieved remaining part to the client device.

17. The method of claim 16, comprising:
determining whether a session number of a solid state disk storing the remaining part reaches a maximum session number;
selecting one of available solid disks in the solid state disk storage; and
duplicating the target object in the selected solid state disk.

18. A method of removing an individual content distributedly stored in a hierarchical storage system including a solid state storage having a plurality of solid state disks, a hard disk storage having a plurality of hard disks, and a tape storage, the method comprising:
determining a target content to remove and an inquiry frequency and a required minimum transmission rate of the target content upon receipt of a request message from a client device;
classifying the target content as at least one of a low demanded content, a normal demanded content, a high demanded content, a low transmission rate content, a normal transmission rate content, and a high transmission rate content based on the inquiry frequency and the required minimum transmission rate of the target content; and
removing a duplication of the target content from at least one of the solid state storage, the hard disk storage, and the tape storage based on the classification result and a distribution and buffering policy.

19. The method of claim 18, wherein when the target content is classified to at least one of the low demanded content and the low transmission rate content, the retrieving the target content comprises:
determining whether a duplication is stored in one of hard disks in the hard disk storage; and
removing the duplication from the hard disk storage when the duplication is stored in one of the hard disks.

20. The method of claim 18, wherein when the target content is classified to at least one of the normal demanded content and the normal transmission rate content, the retrieving the target content comprises:
- determining whether a duplication is stored in a first solid state disk in the solid state disk storage;
- removing the duplication from the solid state disk storage when the duplication is stored in one of the solid state disks;
- determining whether a duplication is stored in one of hard disks in the hard disk storage when the duplication is not stored in one of the solid state disks; and
- removing the duplication from the hard disk storage when the duplication is stored in one of the hard disks.

* * * * *